(12) United States Patent
Aichroth et al.

(10) Patent No.: US 8,615,472 B2
(45) Date of Patent: Dec. 24, 2013

(54) METHOD OF PROVIDING A VIRTUAL PRODUCT TO THIRD PARTIES

(75) Inventors: Patrick Aichroth, Ilmenau (DE); Jens Hasselbach, Erfurt (DE); Stefan Puchta, Langewiesen (DE); Thomas Sporer, Fuerth (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 420 days.

(21) Appl. No.: 12/608,829

(22) Filed: Oct. 29, 2009

(65) Prior Publication Data

US 2010/0049657 A1    Feb. 25, 2010

Related U.S. Application Data

(62) Division of application No. 10/821,418, filed on Apr. 9, 2004, now abandoned.

(30) Foreign Application Priority Data

Jan. 22, 2004   (DE) .......................... 10 2004 003347

(51) Int. Cl.
   *G06Q 99/00*   (2006.01)
(52) U.S. Cl.
   USPC .............................................. 705/59; 705/51
(58) Field of Classification Search
   USPC ..................................................... 705/51, 59
   See application file for complete search history.

(56) References Cited

U.S. PATENT DOCUMENTS

| | | | |
|---|---|---|---|
| 4,811,325 A | 3/1989 | Sharples et al. | |
| 5,675,734 A | 10/1997 | Hair | |
| 5,892,900 A * | 4/1999 | Ginter et al. | 726/26 |
| 5,966,440 A | 10/1999 | Hair | |
| 6,282,611 B1 | 8/2001 | Hamamoto et al. | |
| 6,865,430 B1 | 3/2005 | Runton et al. | |
| 7,136,945 B2 * | 11/2006 | Gibbs et al. | 710/62 |

(Continued)

FOREIGN PATENT DOCUMENTS

| | | |
|---|---|---|
| DE | 10148357 | 10/2002 |
| DE | 10217862 | 11/2003 |

(Continued)

OTHER PUBLICATIONS

English Translation of Text Portion of the Notification of the First Office Action dated Oct. 23, 2009 for parallel Chinese patent application No. 200580001643.7, 2 pages.

*Primary Examiner* — James D Nigh
(74) *Attorney, Agent, or Firm* — Michael A. Glenn; Perkins Coie LLP

(57) ABSTRACT

In a method of providing a virtual product to third parties, the virtual product being present in an original version in a digital form having a predetermined quality, a reduced version of the virtual product, along with information relating to a distributor of the virtual product, is initially provided. The reduced version's quality is inferior to the quality of the original version, and the information relating to the distributor are associated with this reduced version. On the basis of the information associated with the reduced version, further information may be created. This further information indicates that the reduced version has been passed on to the third party by the content provider. The further information is created if the third party has acquired rights to the virtual product after having obtained the reduced version of same.

6 Claims, 6 Drawing Sheets

(56) References Cited

U.S. PATENT DOCUMENTS

| | | |
|---|---|---|
| 7,370,017 B1 * | 5/2008 | Lindeman et al. ............ 705/59 |
| 7,421,411 B2 * | 9/2008 | Kontio et al. ................ 705/52 |
| 7,653,552 B2 * | 1/2010 | Vaidyanathan et al. ....... 705/1.1 |
| 2001/0037431 A1 | 11/2001 | Hamamoto et al. |
| 2002/0000156 A1 | 1/2002 | Nishimoto et al. |
| 2002/0003886 A1 | 1/2002 | Hillegass et al. |
| 2002/0056117 A1 | 5/2002 | Hasegawa et al. |
| 2002/0138291 A1 * | 9/2002 | Vaidyanathan et al. .......... 705/1 |
| 2002/0144278 A1 | 10/2002 | Pratts et al. |
| 2003/0078888 A1 | 4/2003 | Lee et al. |
| 2003/0078889 A1 | 4/2003 | Lee et al. |
| 2003/0095660 A1 | 5/2003 | Lee et al. |
| 2003/0125964 A1 | 7/2003 | Chang et al. |
| 2003/0195851 A1 | 10/2003 | Ong |
| 2003/0235316 A1 | 12/2003 | Chambers et al. |
| 2004/0059683 A1 * | 3/2004 | Epstein et al. ................ 705/64 |
| 2004/0128324 A1 * | 7/2004 | Sheynman et al. ........... 707/200 |
| 2004/0139318 A1 | 7/2004 | Fiala et al. |
| 2004/0198308 A1 * | 10/2004 | Hurst et al. ................. 455/403 |
| 2005/0060177 A1 | 3/2005 | Sporer et al. |
| 2005/0069129 A1 | 3/2005 | Ho et al. |

FOREIGN PATENT DOCUMENTS

| | | |
|---|---|---|
| EP | 0696121 | 2/1996 |
| EP | 1229469 | 8/2002 |
| EP | 1284481 | 2/2003 |
| WO | WO01/04803 A1 * | 1/2001 |
| WO | WO 01/41018 | 6/2001 |
| WO | WO 03/090131 | 10/2003 |

\* cited by examiner

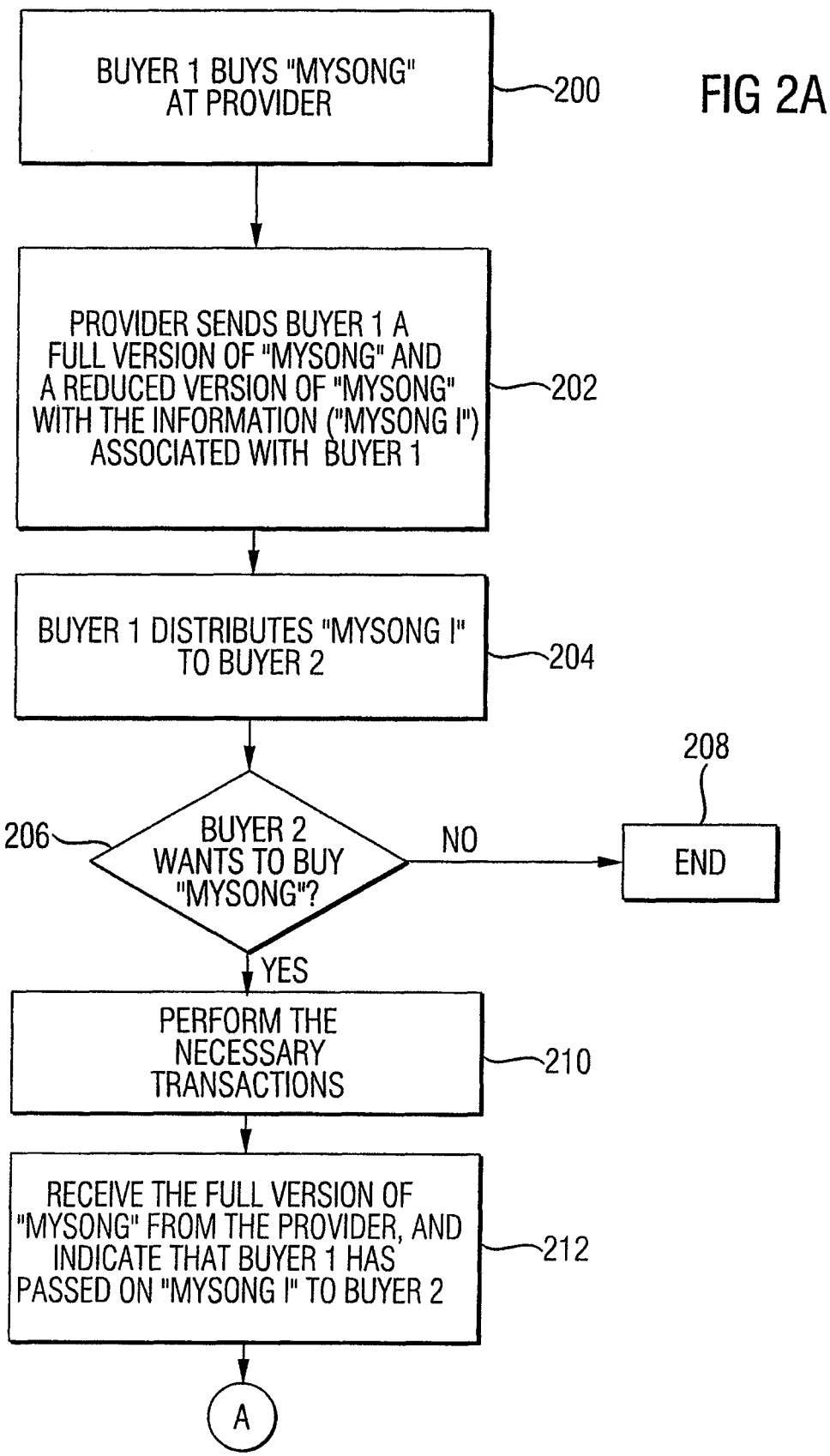

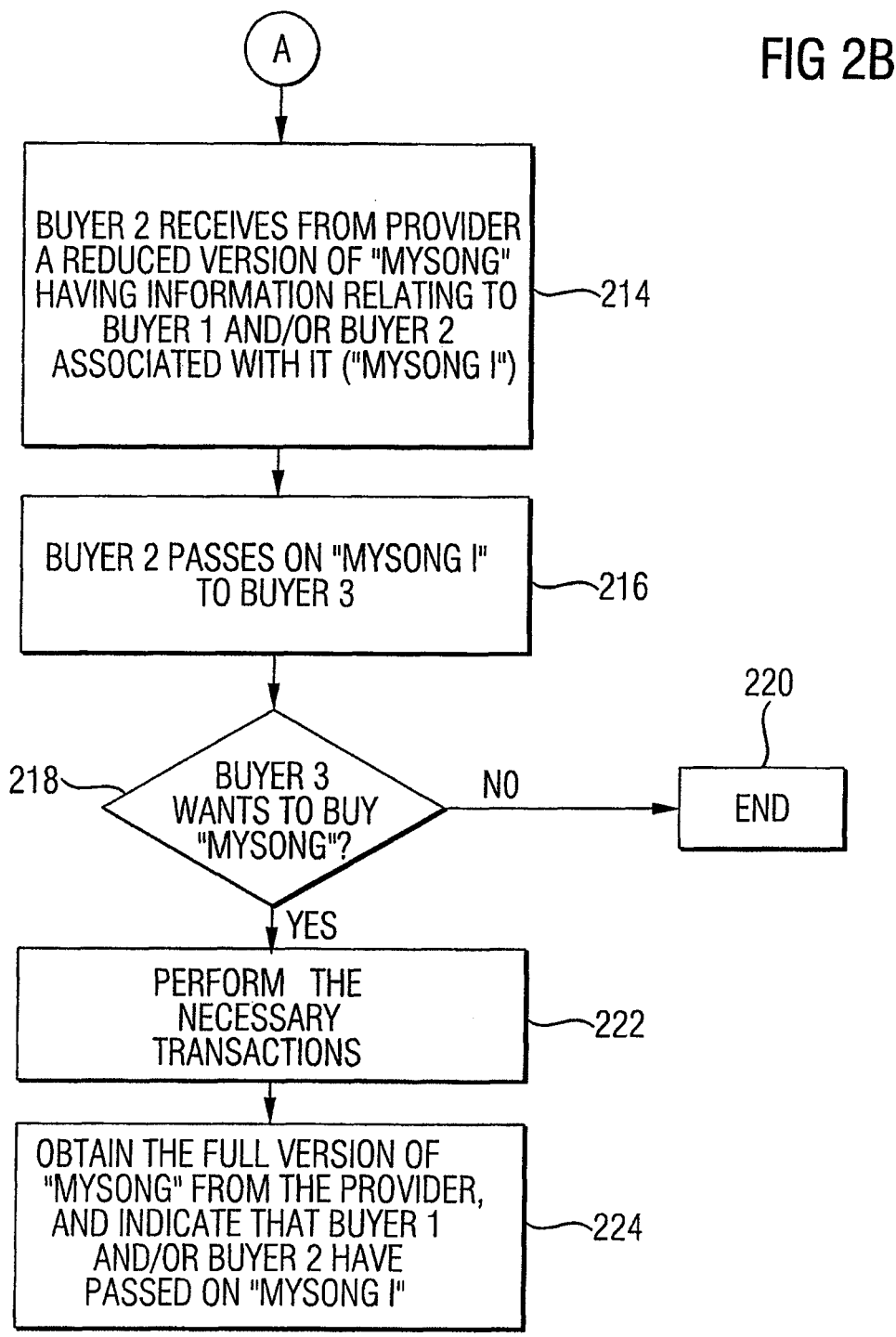

METHOD OF PROVIDING A VIRTUAL PRODUCT TO THIRD PARTIES

CROSS-REFERENCE TO RELATED APPLICATIONS

This application is a divisional of U.S. patent application Ser. No. 10/821,418, filed Apr. 9, 2004, which claims priority from German patent application no. 102004003347.1-53, filed Jan. 22, 2004, all of which are incorporated herein in their entirety by this reference thereto.

BACKGROUND OF THE INVENTION

1. Field of the Invention

The present invention relates to a method of providing a virtual product to third parties, and here it relates, in particular, to a method wherein the virtual product is present in a digital form and further includes additional information indicating which rights a third party having received the virtual product has acquired in relation to same. In addition, the present invention relates to a computer program having a program code for performing the method of providing a virtual product to third parties.

2. Description of Prior Art

The term "virtual product" describes intellectual property, such as music, a novel, a picture, a film, a program or the like, which may be represented in a digital form, typically as a file. Files under consideration are, for example, an MP3 file, a PDF file, an AVI file, an EXE file, and the like.

The production and distribution of a virtual product, such as multimedia, are expensive. The production and distribution are organized by a content provider. The latter bears the economic risk for the goods (virtual product). This is the model on which, e.g., the global music industry is based. The same applies to software distribution. Non-legalized copies or pirate copies of multimedia products and software products as well as their non-licensed passing-on undermine this economic model. In the case of the music industry, there is the question whether it will be possible, in the future, for production to carry on existing at all, when nobody will be able to pay authors, composers and performers anymore, since their products will no longer have any market value.

As a counter-measure, the software and music industries are trying, for example, to limit the uncontrolled circulation of their products. The software and music industries are faced with a dilemma, however: on the one hand, they want to hand out the product to legal buyers, i.e. to transfer the product to the users' devices and thus to pass them on to the user's range of influence. There, however, they are only supposed to be of limited availability to the users' desire to use them. However, it is not the content providers that possess the instruments of power for implementing this limitation, but only their users. However, masses of users renounce to being limited in that way—they rather simply carry on spreading the products purchased. The music industry, for example, reacts to this by presenting a security concept obliging the users to utilize players wherein the use of the products is checked upon in the user's device. The product purchased by the user (content stream) has the specification of so-called IPMP elements contained therein (IPMP=Intellectual Property Rights Management and Protection). It is only these IPMP elements that make it possible at all to be able to play the product acquired on a terminal device. The problem associated with this is that every product contains the elements of its decryption, so that the limitations of the IPMP elements may be lifted by suitable reprogramming. This reprogramming may be performed, for example, by a simple personal computer. The industry standards rely on a large number of customers, the number being significant in terms of the economy, to comply with the functionality of the standardized IPMP devices.

The principle of the common models of rights, e.g. IPMP, provides for an element installed in the terminal device to control the use of a product acquired in the terminal device at the user's end. In particular, it prevents uncontrolled passing-on. Here, the individual user's interest is not met. On the contrary, the user is restricted in his/her freedom. Rather, the user is called upon to undermine, by means of his/her device, the distributor's interest, i.e. the prevention of the uncontrolled spreading of the products.

Thus, this model infringes upon a fundamental principle of open security requirements, i.e. that which states that in an open world of communication partners not subject to any central control, those that pursue an interest must also have the means to push through this interest. This is done, e.g., in exchanging signed declarations of intention, acknowledgements and agreements. Those who have an interest in a promise of their communication partner being met, possess, in the form of the partner's signature, a piece of evidence which cannot be disputed by the partner and with which they may enforce the promise being met, if need be before court.

With the IPMP approach, the contrary applies. Those who have an interest in restricting the use of their products hand out the means for enforcing their interests to a communication partner who will be restricted in his interests by these very means.

This provides an explanation for the big success of Internet exchanges, such as Napster and subsequent file-sharing models.

Thus, there is a need to regain a sound basis for the security model for multimedia rights, especially on the Internet.

An approach is to associate any self-limiting good behavior of users with advantages for them which are more enticing than any behavior deviating therefrom. These advantages could be, for example, discounts, the possibility of returning products, or quality warrantees.

More effective than these incentives, however, is the reversal of the above-mentioned nature of the interests involved, i.e. to the effect that the spreading of multimedia products, which spreading is obviously in the users' interest, may also be recognized by the distributors as being in their own interest, and, accordingly, is not inhibited, but, on the contrary, promoted. The content providers' interest must be for the clients (users) to spread the products as much and as widely as possible, which is not at all bizarre, since the distributor of products anyhow is interested in the products being widely circulated. Of course, a fundamental interest of the distributor is that the product distributed should be paid for.

To achieve this, users are made sales partners of the content providers, i.e. they are made nodal points of sales. Users who pay for and circulate a multimedia product or software or similar virtual product are given a commission out of the purchase price that the receiver pays for the product obtained. If the receiver pays no purchase price, the sender will not receive any commission, in which case the receiver, in his/her turn, will also never be entitled to receive a commission fee. In order to enable the above-described approach, the virtual product must be labeled so as to associate the potentially acquired rights to the virtual product.

An example of the above-mentioned labeling of virtual products has been described, for example, in DE 102 17 862 A, which discloses a method of labeling a virtual product as it is passed on to third parties. The virtual product is present in a digital form, and the labeling indicates which rights a third party having received the virtual product has acquired in relation to the virtual product. In accordance with this method, the virtual product is provided by a distributor, and electronic documentation is created for the virtual product provided and is associated with the virtual product which is present in the form of a file. After the file has been passed on to a third party, if the third party wants to acquire any rights to the virtual product, the necessary transaction for acquiring the desired right is initially performed. Upon completion of the transaction, an electronic acknowledgement is produced and associated with the file having the associated electronic documentation. The acknowledgment has information about the rights the third party has acquired by means of the transaction stored therein.

The method described in DE 102 17 862 A is advantageous in that the buyer of a product is now encouraged to further spread the virtual product he/she has legally acquired, since he/she is now entitled to a commission in the event that a receiver buys this product.

However, a disadvantage is that the virtual product is always sent on to third parties in the original format, i.e. in the original version, so that these third parties will always hold a full version of the virtual product in their hands, irrespective of whether the rights to this product have been acquired or not. Thus, the reward for the first buyer who has passed on the product solely depends on the good will of the receiver who even—though he/she already holds in his/her hand a full version—must effect the purchase of same.

SUMMARY OF THE INVENTION

On the basis of this prior art, it is the object of the present invention to provide an improved method of providing a virtual product to third parties, wherein there is, also on the side of the receiver, an incentive to acquire the virtual product and thus to pay off the reward to the first buyer.

The present invention provides a method of providing a virtual product to third parties, the virtual product being present in an original version in a digital form having a predetermined quality, the method consisting of the following steps:
(a) providing a reduced version of the virtual product, and information relating to a distributor of the virtual product, the reduced version of the virtual product having a quality which is inferior to the quality of the original version, and the information relating to the distributor being associated with the reduced version of the virtual product;
wherein, on the basis of the information associated with the reduced version, additional information, which indicates that the reduced version of the virtual product has been passed on to a third party by the distributor, may be created if the third party has acquired rights to the virtual product after obtaining the reduced version of the virtual product.

In accordance with a preferred embodiment, the method further includes the step of passing on the reduced version of the virtual product to a third party. If the third party, who has received the reduced version of the virtual product, wants to acquire rights to the virtual product in the original version, the necessary transactions will be performed so as to obtain a predetermined right, such as purchase, lease, etc., to the virtual product in the original version. Upon completion of the transaction, the necessary information will be received for obtaining the original version of the virtual product. In addition, on the basis of the information associated with the reduced version, information will be produced which indicates that the transaction is based on the passing-on of the reduced product by the distributor.

In accordance with a first preferred embodiment of the present invention, the reduced version of the virtual product is a copy of same of reduced quality. In this case, receiving the information for obtaining the full version includes receiving the original version of the virtual product. In this case, the reduced version may be effected by limiting the bit rate/bandwidth of the original version of the virtual product, by inserting voice and/or sound into the original version or by hierarchical coding of the original version, the coding here including dispensing with certain improvement layers, i.e. providing only a base layer. In addition, the copy of reduced quality may be obtained by manual or automatic cutting of the original version.

For producing the reduced version, technologies may generally be used which extract significant parts of the original version of the virtual product. Here, e.g., characteristics of the audio signal are used for finding musical segments in the piece, which may also be referred to as "audio segmenting".

Thus, manual cutting, automatic cutting and all intermediate stages may be used for creating a preview (for example, manual cutting may be facilitated by "proposals" provided by audio-segmenting algorithms).

The term "segmenting" is used in two manners, e.g., in automatic analysis of music: firstly, in the microscopic sense, for the separation of individual sound and/or note objects, secondly, from a more or less macroscopic perspective, for the separation of individual musical theme segments such as introduction, verse, chorus, solo, instrumental part, interlude etc. This is to be referred to as musical segmenting. For automatic detection of the latter segments, various technologies and approaches were known in the past which are mostly based on the extraction of so-called low-level features and a comparison of same within a piece of music. What is referred to as low-level features are close-to-signal features which are taken from the audio signal at relatively small expense, but which are, in principle, different from the manner in which humans perceive music. An example of this is the number of zero crossings of the signal per time, the spectral course of energy, spectral flatness and the main focus of the spectrum. Those features which describe music in a semantically higher sense would be, among others, the pitch, the instruments involved and the line and characteristic of singing. Musical segmenting is possible with both types of features, an extraction of the semantically higher-level features, however, being more difficult and only to be achieved at higher computational expense.

Alternatively, in accordance with a second preferred embodiment, the reduced version of the virtual product may be an at least partially encrypted version of the original version, so that, here, receiving the information for obtaining the full version includes receiving a key for decrypting the at least partially encrypted version. In this case, provision of the reduced version includes at least partial encryption of the original version of the virtual product.

The information relating to the distributor of the reduced product preferably includes the introduction of additional data into the reduced version of the virtual product, for example in accordance with the MPEG-1/2 standard and/or the MPEG4 standard, by using a specific format and/or by a watermark.

In accordance with a further preferred embodiment of the present invention, the buyer of the virtual product is also provided with a reduced version of same after the purchase, and further information relating to the distributor and/or the third party are provided to this further reduced versions.

Hereby, in a further passing-on of the reduced version to a further third party, a production of further information is enabled which indicate that an acquisition of a predetermined right to the original version of the virtual product by the further third party is based on the passing-on of the reduced version by the distributor and/or the third party.

In accordance with a further preferred aspect, the present invention provides a computer program having a program code for performing the inventive method if the program runs on a computer.

Thus, an improved method of providing virtual products to third parties is provided in accordance with the present invention, which method enables, especially with multimedia files, a sales promotion in the distribution of the multimedia contents by creating, passing on and, later on, associating personalized content samples. Unlike conventional distribution systems which conventionally prevent the buyer, in one form or other, from passing on the content "discovered" by him/her, in accordance with the invention, the passing-on of the content in the form of inferior previews (reduced version of the original version of the virtual product) is not prevented, but rewarded.

The inventive approach has the effect that the natural motivation of consumers to go around on a mission of spreading their "discoveries" among others is not suppressed but promoted. By personalizing the previews, successful advertising may be associated with the advertiser, which enables various forms of reward.

The inventive method provides a number of benefits. Firstly, passing on previews is more attractive than passing on the original full version, i.e. the original content, since, for one thing, a reward may be obtained, and, secondly, the use of restrictive technical protective measures that would have been required to protect the original content may be dispensed with, which, among other things, increases the user-friendliness. In addition, this yields a positive sales effect (advertisement) by the content being passed on, whereas the negative consequences of a sale that would have arisen from the passing-on of the original version are eliminated. The inventive approach further provides an additional benefit and "is fun", since the buyers may go round doing "missionary" work and are even rewarded for it. They are also in a position to co-create the type of advertising, which gives rise to competition among the buyers. A further advantage is that the previews may be passed on, in principle, via any distribution channel. What is also advantageous is that the inventive method may be added to and/or integrated into various, already existing distribution systems at a later date without significant expense.

In accordance with the invention, the method thus provides a distribution system for virtual products or goods, e.g. audio/music, video etc., which system is based on making the content known as much as possible so as to achieve financial profits for artists and labels.

The idea on which the present invention is based is that when or upon buying an object, the customers obtain a devalued copy (reduced version) of the original, i.e. a preview, this copy being customized and containing all information for a new purchase. Free passing-on of this preview is not only permitted, but desired. If the passing-on results in a new purchase, the transaction may be associated with the advertiser. This may be the basis for various business models rewarding successful advertising. This gives rise to a "natural" incentive for the buyer to not pass on the original, but previews. The free distribution of previews thus leads to a high degree of familiarity with the content and thus acts to promote sales. Due to the small size of the previews, many distribution channels may be considered. The system may coexist with an existing copy protection, but is not dependent thereon. In addition, the centrally collected data are suitable for market research purposes.

In accordance with the preferred embodiment of the present invention, there are two variants of models, i.e. the "small preview" and the "large preview". With the small preview, it is only ever the inferior copy that is passed on. The full-value version and/or the original version must be re-transferred upon purchase. In the "large preview", an artificially devalued version of the original, which, however, already contains the information required for becoming a full-value product, is passed on. What needs to be done at the time of purchase is to only transfer/acquire a key so as to obtain a full-value product.

In addition, provision may be made for the buyers to continue creating the previews assigned to them by themselves, i.e. to perform their own cuts, to introduce additional information, e.g. their own opinion, information about the performer, words and the like. References to personal websites may also be included. This information may be provided in any common format, e.g. in the HTML format or in the XML format.

The inventive method is open to a variety of possible applications. Mention shall be made, for example, of the method described in the above-mentioned DE 102 17 862 A, wherein, in this case, the reward would be in the form of a share in consequential proceeds. Distribution may be effected via a conventional download or via a peer-to-peer approach. Common download portals may be expanded, using the inventive method, by providing the reward for example in the form of bonuses, titles, points and certain privileges, such as "preferred user", or in the form of a contact with an artist. The conventional, or traditional, distribution may also be expanded. By providing a tool to the buyer of an audio CD or a DVD, e.g. on the CD/DVD or via a download, previews of the conventional audio CDs or DVD audios may be created and passed on.

A so-called "super distribution" also opens up, in accordance with which the "large previews" are distributed on physical sound carriers or via networks, the enabling, or activation, being effected by a key at a later stage. In addition, in this context, the "large previews" may be added to conventional sound carriers upon delivery.

For existing P2P (peer-to-peer) services, there is, in accordance with the invention, the possibility of an addition by sharing a number of previews without any originals being provided. In addition, a bond to the download portal is facilitated.

For a preview portal there is a possibility of providing new content and to determine the circulation, popularity and value of same. In addition, it is possible to determine good scouts, i.e. distributors who advertise successfully and/or prove to have a good nose for content with potential for the future.

In accordance with a further embodiment, the inventive method may serve as a "bait" via print media; entry codes, e.g. on an admission ticket being assigned for concerts, at the cinema or similar events, which entry codes provide, after having being input, certain previews for downloading, in this case the reward being granted, upon purchase of the full version, to the organizer having provided these entry codes on the admission ticket.

For storing and transmitting audio/music contents as previews, common standards such as MPEG-1/2 or MPEG-4 as well as audio coding methods such as MP3, AAC, among others, but also MIDI, are preferably suitable. Potential distribution media are, preferably, networks, portable storage media, portable computers, and mobile phones. The choice of the format and coding method suitable in each case depends on the distribution medium; for the transmission via mobile phone, for example, the MMS standard is suitable.

For producing a devalued copy for the "small previews", either a qualitative restriction (sound quality) or quantitative restriction (length) are both suitable. Qualitative restriction is achieved, for example, by a psychoacoustic "intelligent" restriction of the bit rate/bandwidth of the original version. In addition, the bit rates/bandwidth may also be restricted manually. In addition, of course, natural voice and/or synthetic sounds may be added. This may be achieved by performing, prior to coding, a level reduction and, subsequently, by inserting the voice and/or sounds. Alternatively, hierarchical coding may also be effected, in this case use being made only of the base layer, while any improvement layers are dispensed with, however.

Quantitative restriction may be effected, for example, by the above-described manual or automatic cutting. The above-described methods of qualitative and quantitative restriction may also be combined, quantitative restriction having the advantage, in principle, that thereby more favorable legal conditions may be achieved, especially with regard to potential fees that may incur (compared to the fees required in the passing-on of the full version).

The technical method of implementation for the "large previews" is encryption, an inferior quality being achieved here without the appropriate key. Similarly, hierarchical coding may be effected here, wherein the preview contains only the base layer, and the full-value version additionally contains the improvement layers that may be enabled by means of the key required.

In traditional distribution, the connection between preview and original may be effected, for example, by suitable audio identification.

The personalization and/or introduction of additional information into the preview may be achieved by conventional formats, such as the auxiliary data in accordance with the AAC standard and the MP3 standard (ID3 tag). Alternatively, a specific format may be used, or a watermark may be introduced.

BRIEF DESCRIPTION OF THE DRAWINGS

Preferred embodiments of the present invention will be explained below in more detail with reference to the accompanying figures, wherein:

FIGS. 2A and 2B show a flow chart of the inventive method in accordance with a preferred embodiment;

DESCRIPTION OF PREFERRED EMBODIMENTS

Figure 1:
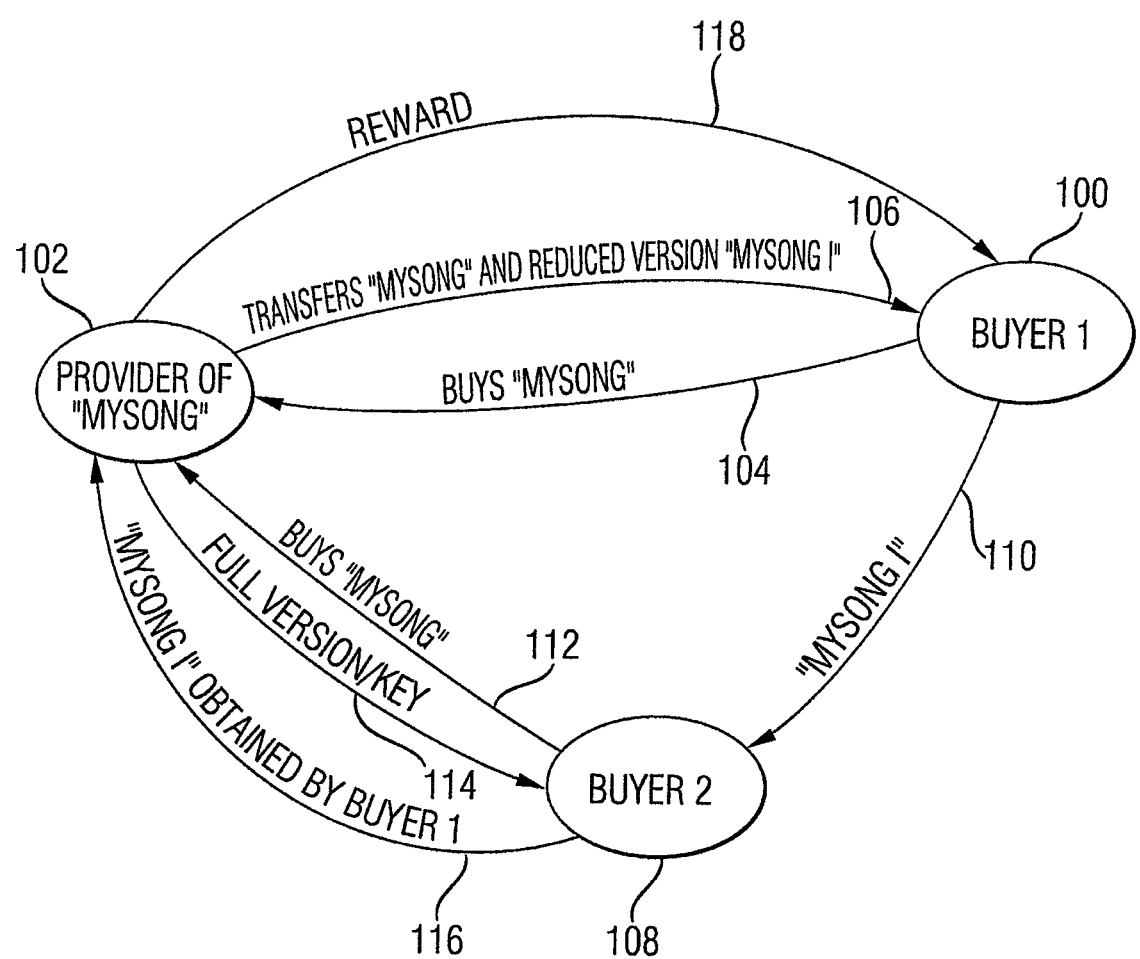
FIG. 1 is a graphic representation for illustrating the inventive method.

In the following description of the preferred embodiments of the present invention, the same reference numerals will be used for elements which are identical or have the same effects.

FIG. 1 shows a graphic representation illustrating an overview of the inventive method. A first buyer 100 has information about a virtual product he/she is interested in, in the exemplary case a title of music that may be referred to, by way of example, as "mysong". The music title "mysong" is provided and offered for sale by a provider 102, e.g. a network service, a record company or the like. The first buyer 100 now buys the music title "mysong" (arrow 104), and, consequently, provider 102 transfers a full version of the music title "mysong" along with a reduced version of "Mysong I" (see arrow 106) to the first buyer 100. The reduced version further has information about the first buyer 100 associated with it, which information label him/her as the buyer of the full version. This information was obtained, for example, during the purchasing action. Alternatively, provision may be made for the first buyer 100 to have the instruments required for creating the reduced version from the full version and, in addition, to associate the information that have been associated with the buyer with this reduced version. In this case, a further transferal between the first buyer 100 and the provider 102 would be necessary for providing this information, in particular the association between the reduced version and the first buyer, to the provider as well.

After the purchase of the piece of music, the buyer 100 decides to pass it on to an acquaintance, the second buyer 108. In accordance with the invention, the first buyer 100, however, does not pass on the full version, but only the reduced version with the information associated with the first buyer 100, as is shown by arrow 110. The second buyer 108 now plays the reduced version of the music title and decides to acquire a full version of same. Therefore, he/she buys the full version of "mysong" from the provider 102 (see arrow 112) and in turn (arrow 114) obtains, from provider 102, the full version and/or the key for converting the reduced version to the full version. In addition, information indicating that the second buyer 108 has obtained the reduced version from the first buyer 100 is passed on to the provider 102. For this purpose, for example, the information associated with the reduced version may simply be passed on to the provider 102 from the second buyer 108, as is shown by arrow 116. On the basis of the information obtained from the second buyer 108, the provider 102 determines the specified reward for the first buyer 100, e.g. in the form of a commission, and passes it on to the first buyer 100, as is indicated by arrow 118.

In the example shown in FIG. 1, provider 102, who offers a plurality of music titles or other virtual products for sale, is provided. These products may be products that have been produced by the provider himself/herself, or such products that have been produced by others and are marketed via the provider 102. In this case, that person who has created the music title "mysong" would initially register with the provider 102 to ensure that the sales proceeds are proportionally given also to the true owner of the rights. This may be effected, for example, in a manner as has been described in DE 102 17 862 A.

With regard to FIGS. 2A and 2B, the inventive method for implementing the procedures as have been described with reference to FIG. 1 will now be explained in more detail. The inventive method preferably starts by the first buyer 100 buying the music title "mysong" at the provider 102 in step 200. Then, in step 202, the provider 102 sends a full version of "mysong" and a reduced version of "mysong", which additionally contains information associated with the first buyer, to the first buyer 100. In step 204, the first buyer 100 passes on the reduced version, i.e. the preview of "mysong", to the second buyer 108, who, in step 206, decides whether or not he/she wants to buy the full version of "mysong". If the second buyer 108 does not want to buy the full version, he/she keeps the reduced version only, and the process ends at 208.

If the second buyer 108 decides to buy "mysong", the process continues at step 210, where the necessary transactions are performed to obtain a predetermined right to "mysong", for example ownership, utilization period limited in time, or the like. This transaction, for one thing, includes the indication of which rights the second buyer 108 wants to acquire (dependent on the available rights offered by the provider 102), and includes, secondly, the appropriate payment, which may be effected using a conventional online-payment system, e.g. Paybest, Micromoney, Paybox or the like. Once the transactions required for obtaining rights to "mysong" have been successfully completed, the full version of "mysong", for example, is provided to the second buyer 108 by the provider 102 in step 212. In addition, it is now indicated that the preview, on the basis of which the second buyer 108 has effected the purchase, has been passed on to the second buyer 108 by the first buyer 100. On the basis on this information, the provider 102 then determines a reward to which the first buyer 100 is entitled.

FIG. 2B shows further steps in accordance with a preferred embodiment of the present invention, which relates to the inventive procedure if the second buyer 108 also passes on a reduced version of his/her music title to an additional, third buyer. If the second buyer 108 is to be given this possibility, he/she receives, in a manner similar to the first buyer, a reduced version of "mysong" from provider 102, or creates, by means of suitable instruments, on the basis of the full version obtained or of the reduced version available to him/her anyway, a new, reduced version containing additional information that either only relate to him/her, the second buyer 108, alone, or add, in addition to the first buyer 100, information about the second buyer 108 to the reduced version. Once these actions have been effected in step 214, the second buyer may distribute, in step 216, the preview or the reduced version thus altered to the third buyer. In step 218, the third buyer decides whether he/she also wants to buy I"mysong". If this is not the case, the process ends at 220. If the third buyer wants to buy "mysong" and/or wants to acquire certain rights to it, the necessary transactions are performed in step 222, in a manner similar to step 210. In step 224, in a manner similar to step 212, the necessary action is then performed to send the full version of "mysong" to the third buyer. In addition, the information associated with the preview and relating to the first buyer and/or the second buyer is passed on to the provider to give the provider the opportunity to pass on the specified reward to the first buyer and/or the second buyer.

The various above-described steps may now be repeated for any number of other buyers.

Figure 3:
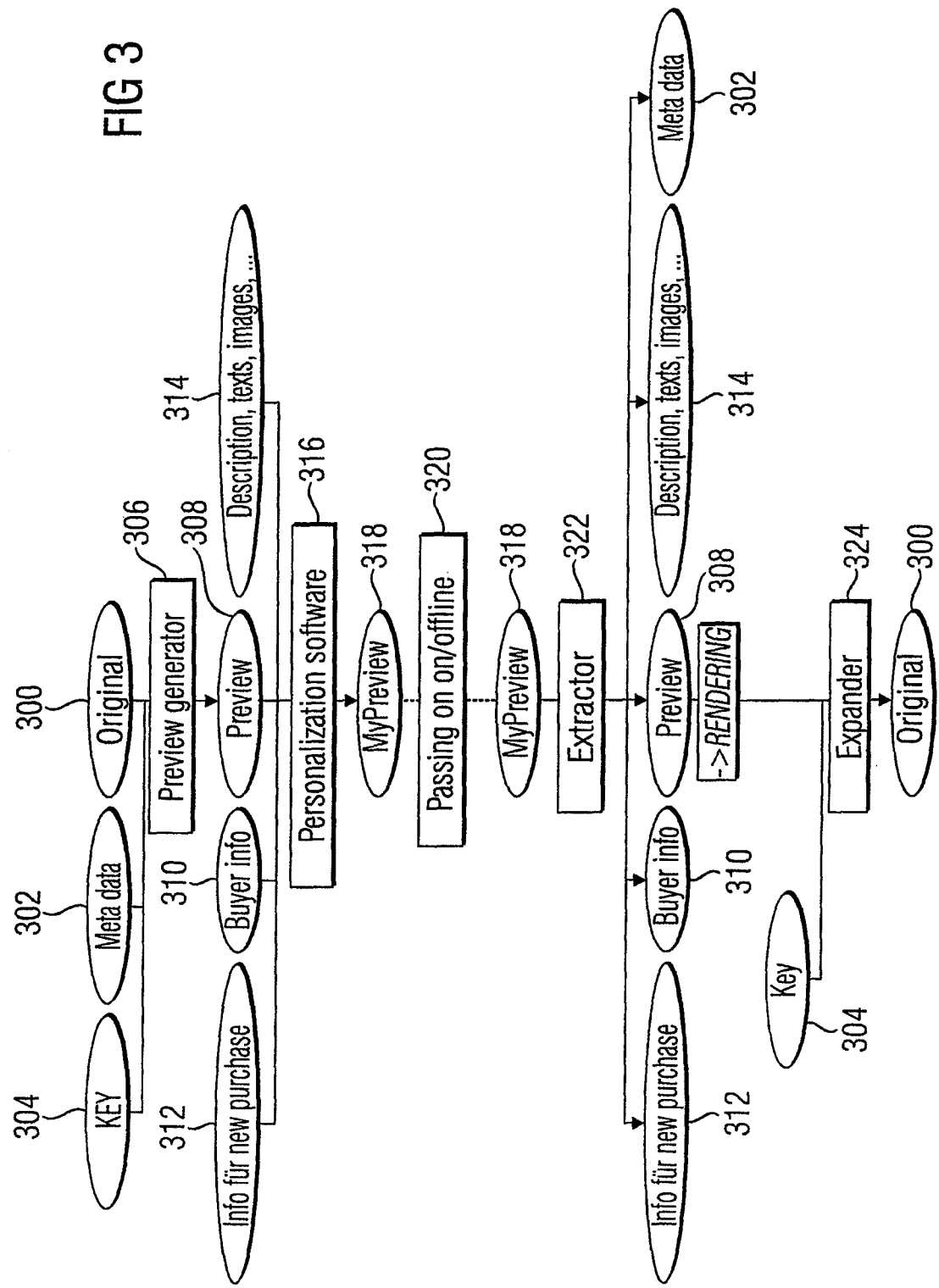
FIG. 3 is a graphic representation for illustrating a preferred embodiment of the inventive method.

FIG. 3 shows a graphic representation for illustrating a preferred embodiment of the inventive method, this embodiment being based on the assumption that a first buyer 100 receives only the original version from the provider, and, in addition, has the necessary instruments, e.g. in the form of suitable software tools, that may be provided by the provider, to create the reduced version with associated information relating to the first buyer 100. Alternatively, provision may of course also be made for both the original version and the reduced version with relevant customer information to be transferred to the first buyer by the provider, as has already been mentioned above.

The first buyer 100 has obtained an original version 300 of the virtual product, e.g. of the music title "mysong", along with metadata 302 associated with the original 300, and a key 304 (the key is only required for the "large previews" to at least partially encrypt the full version for creating the preview; for the "small preview", no encryption is performed). On the basis of the original 300, the metadata 302 and the key 304, the reduced version (the preview) 308 of the original 300 is created in a preview generator 306. Via further software tools, the preview 308 is now associated buyer information 310 as well as information relating to the new purchase 312. This information 312 relating to the new sale includes a reference to the content and a reference to the server. In addition, a reference to the (new) buyer may be given. In addition, the first buyer 300 may associate further information 314, e.g. in the form of a description, of texts or images, with the preview 308. On the basis of the preview 308 and the further information 310-314, a personalized preview (MyPreview) 318 is created via a personalization software 316. In addition to the actual preview, this personalized preview 318 now also contains all data required for identifying the first buyer with sufficient accuracy, after the passing-on and after the purchase of the original version by a third party, so that the first buyer obtains the specified reward.

The first buyer 100 now has the possibility of passing on the personalized preview 318, as is shown at 320. The distribution to a second buyer is effected either online or offline. This second buyer 108 receives the personalized preview 318. The second buyer possesses the instruments required for obtaining, from the preview 318 received, the information he/she is interested in. For this purpose, the extractor 322 is provided, which creates, from the personalized preview 318, firstly the original preview 308 as well as the information 302, 310, 312 and 314 associated with same, but does not create the key 304. The second buyer 108 now has the possibility of viewing the preview 308 and to decide whether he/she wants to obtain the full version. If he/she decides to acquire the full version, the necessary transactions are performed, as has been described above, and, in addition, the buyer information 310 is passed on to the provider so as to initiate the reward to the first buyer 100. In addition, the second buyer 108 obtains, after the purchase of the full version, the missing key information 304. The expander 324, in turn, creates the original 300 on the basis of the preview 308 and key 304.

Figure 4:
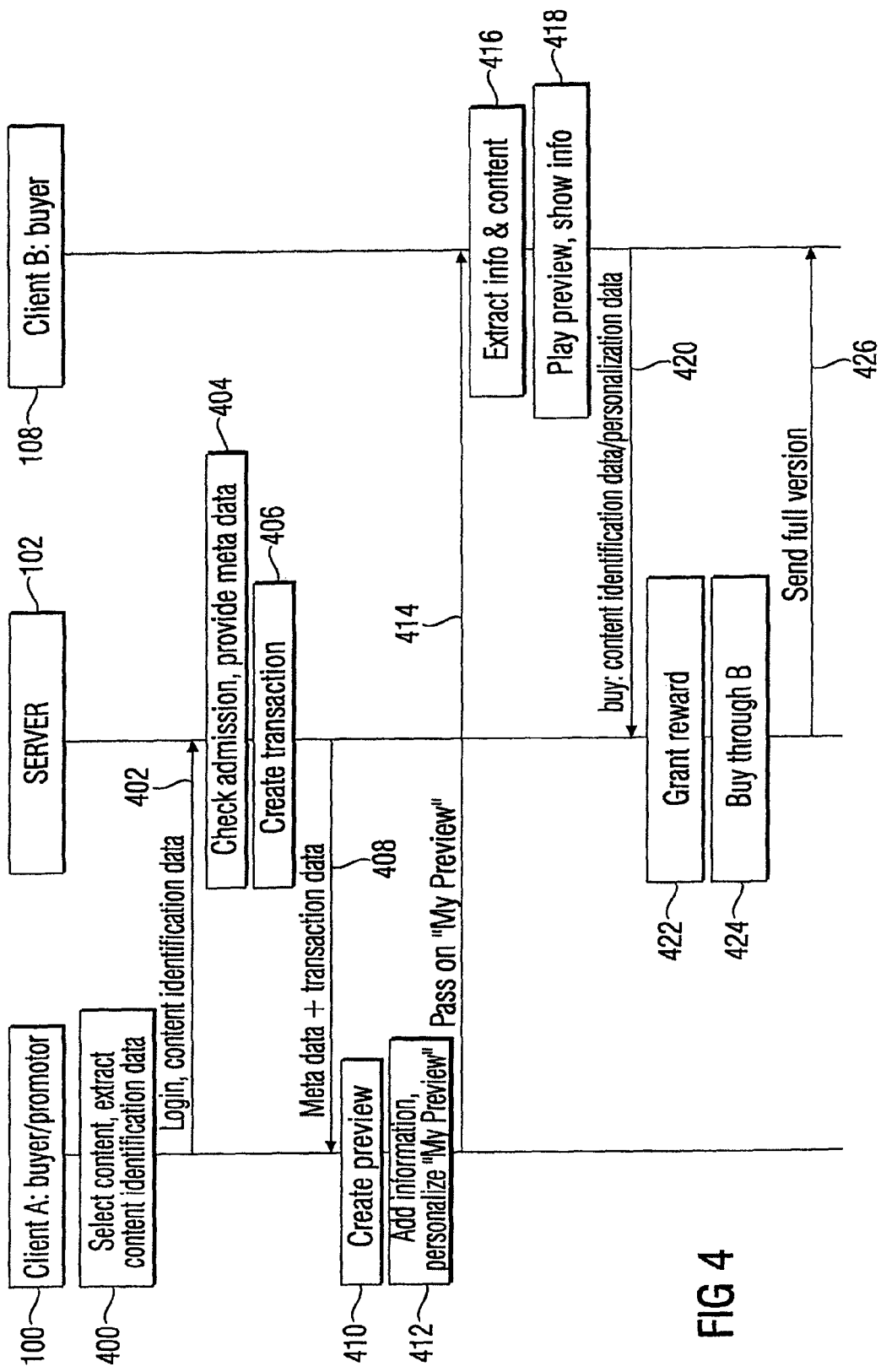
FIG. 4 is a representation of the actions between different entities if the reduced version of the virtual product is a "small preview"

FIG. 4 shows a representation of the actions being effected between a first buyer, a second buyer and a server, if, after the acquisition of a music title, the inventive method is performed using the so-called "small preview". The acquisition here may be effected in a conventional manner, for example via an audio CD, or online, by acquiring an appropriate audio file. The description of FIG. 4 is based on the assumption that client A (see reference numeral 100) is a first buyer and/or a promoter who has already acquired, in the above-described manner, and now possesses a full version of the piece of music. In addition, the server 102 is provided, which, similar to the provider in FIGS. 1 and 2, contains and provides the necessary information for, firstly, providing the additional buyer with the information required for enabling the full version, and, secondly, to send the buyer the reward to which he/she is entitled. In FIG. 4, the second buyer is referred to as client B (see reference numeral 108).

Once the first buyer 100 has obtained the piece of music, he/she may decide to participate in the inventive method, it being assumed, in this case, that he/she already possesses the instruments required. If this is not the case, he/she may register with server 102, as a participant in the method, and will then obtain the corresponding information for identifying himself/herself towards the server, and will also obtain the software tools required for performing the steps required. It shall be assumed, for the example of FIG. 4, that the first buyer 100 is already registered with server 102, i.e. that all the necessary preparatory steps have already been taken. As has been mentioned above, examples of such preparatory steps may be seen in DE 102 17 862 A.

If the first buyer 100 decides to participate in the method, i.e. to pass on a reduced version of the piece of music required by him/her to a third party in the form of a preview, he/she initially selects, at 400, which contents, i.e. which pieces of music, are to be distributed in accordance with the invention. It shall be assumed, by way of example, that only one piece of music, i.e. one content, is selected. Those pieces of music that have been acquired by the first buyer 100 have each been associated unique identification data, the so-called content identification data, which are also extracted in step 400. Subsequently, the login of the first buyer 100 at the server 102 and the trans-feral of the content identification data to the server 102 are performed so as to indicate to same for which pieces of music or contents the first buyer 100 wants to participate in the inventive method (see arrow 402).

On the basis of the login information and the content identification data, the server 102 initially verifies, at 402, whether the first buyer 100 is a registered user, and if this is confirmed, the metadata associated with the content are retrieved, e.g., from the server database or from a separate metadata service. The metadata are a semantic description of the content and include, e.g., information about the author, title, description, publication date, format, etc. In addition, the verification of the "admission" may include a further step, i.e. the verification whether the registered user is also permitted to produce a preview for the respective content (for the event that a broker of rights does not want to admit this type of distribution). Subsequently, at 406, the transaction is produced, and the metadata retrieved as well as the transaction data produced are transferred back to the first buyer 100 at 408. The transaction is a paraphrase for various actions on the server which are associated with the purchase. Usually this includes payment to be effected at this point, and a unique transaction number to be created, which may then be used as "buyer info" (or indirect reference to the original buyer, 310) for previews. Obviously, there are other possibilities, e.g. introducing the customers' reference, login name or other information which uniquely reference the customer. Based on the full version that the first buyer 100 possesses, and based on the data that were received at 408 from the server 102, at 410, the reduced version, the preview, is created, based initially only on the original version, and at 412, based on the further information relating to the first buyer 100 as well as on the information received from server 102, the preview created at 410 is personalized. This personalized preview may then be passed on, just like at 414, to the second buyer 108, who, at 416, performs the steps required for extracting those pieces of information from the personalized preview that have been added to it, so as to separate the information from the actual preview. The information may then be indicated, and the preview may be played, as shown in 418.

If the second buyer 108 decides to buy the full version of the music title, the content identification required for describing the music title to be acquired as well as the personalization data associated with the first buyer 100 are passed on to server 102, as is shown at 420. At 422, server 102 grants the specified reward to the first buyer, and at 424, the purchase of the music title in its full version is effected by the second buyer 108. Subsequently, at 426, server 102 sends the full version to the second buyer 108.

In connection with the above description of the procedure in accordance with FIG. 4 it is to be noted that the content identification required at 400 may be implemented by a number of approaches. To be considered for this purpose are the CDDB protocol for audio CDs/physical carriers, so-called audio fingerprinting for individual titles as well as the use of any unique identification marks, as long as these are used in the system and are known to the user.

The creation of the preview, described at 410, may either be effected using a format of its own or using existing formats (e.g. MPEG-1/2 or MPEG-4), it being possible, if need be, to introduce additional data as ancillary data, here, or, at MP3, in an ID tag. Within the framework of the creation of the preview, the original version is subject to quantitative and/or qualitative devaluation. Quantitative devaluation of the original may be effected, for example, by the above-described manual or automatic cutting of the music title and may either be specified on the server 102 or is left up to the user 100 to decide. What is suitable for qualitative devaluation of the original is a reduction of the bit rate and/or bandwidth of the full version. In addition, (recorded) voice elements and/or noise/sounds may be inserted. Furthermore there is the possibility of further coding, as has already been set forth above.

When creating the personalized preview version at 412, the additional information, images, descriptions, evaluations, further metadata and the like may be incorporated on the basis of XML and/or HTML technologies. The personalization and/or introduction of the further information referring to the buyer may be effected, for example, by entering an unencrypted or encrypted figure referring to the buyer in a direct or indirect (e.g. via a transaction number) manner. In addition, a watermark transporting the above-mentioned information may also be introduced.

Optionally, the following security approaches may be implemented. In the creation of the preview, the original content (the original full version) and the metadata may be connected, e.g. via the fingerprinting/audio fingerprinting technology (e.g. the use of audio ID). To ensure the integrity an authenticity of data, methods such as fingerprinting and digital signatures may be used. Alternatively, it is also possible to deposit a fingerprint. In addition, a secure transmission of the data may be performed using, e.g., the SSL (secure socket layer).

Figure 5:
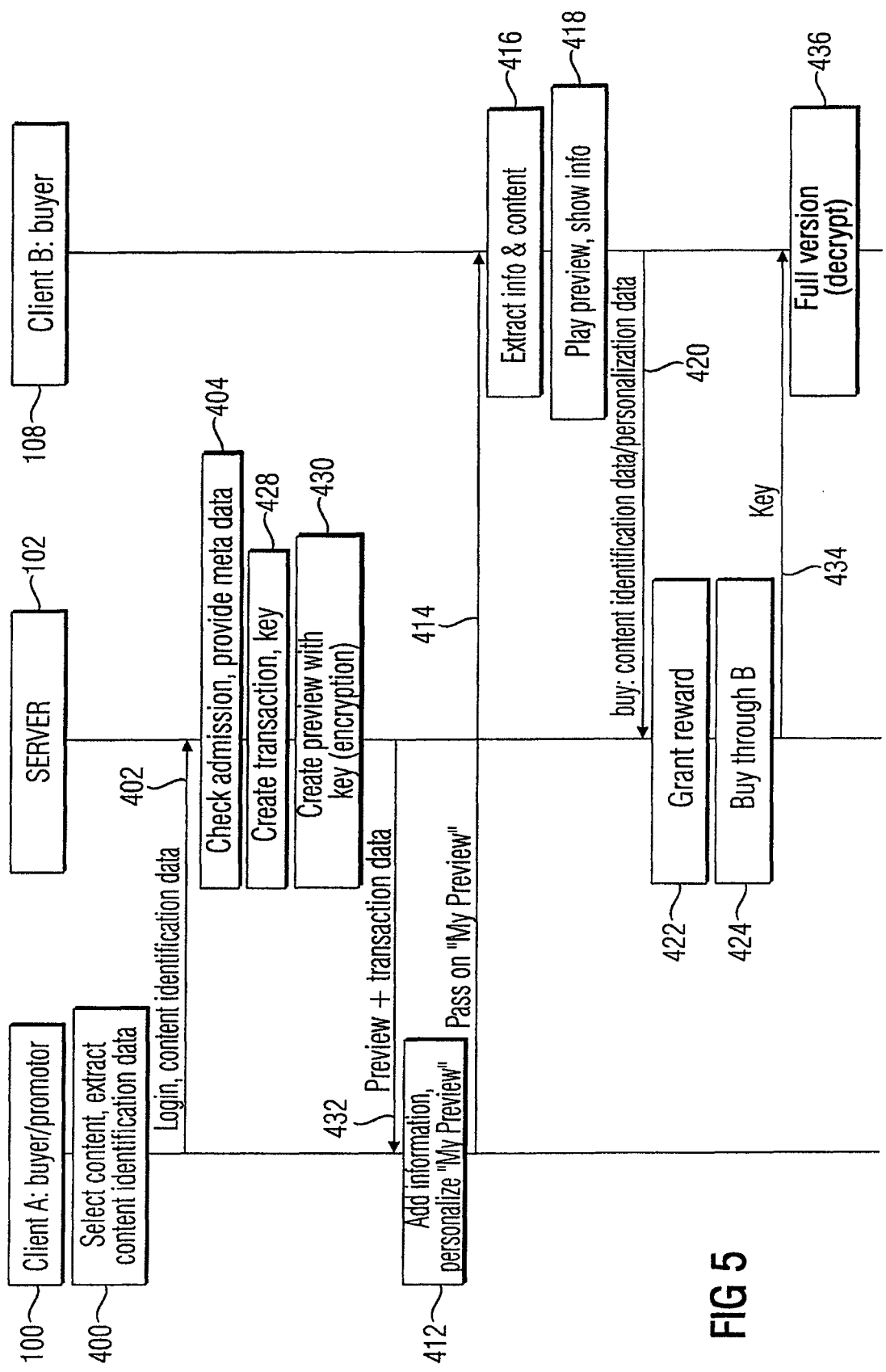
FIG. 5 is a representation of the actions between various entities if the reduced version of the virtual product is a "large preview".

With reference to FIG. 5, a further embodiment of the present invention will be described below, which is similar to that in FIG. 4, but uses a "large preview" instead of the "small preview". Those blocks shown in FIG. 5 which are identical to the blocks shown in FIG. 4 have been given the same reference numerals.

As a comparison of FIG. 4 and FIG. 5 reveals, the two methods mentioned differ only in a few aspects, it being worth mentioning, in particular, that the reduced version on the server is created by means of encryption, and that in order to create the full version, the server only needs to pass on the matching key to the server.

In particular, in the subsequent step 428, in a manner similar to step 406 in FIG. 4, a transaction, and, here, additionally a key, is initially created in server 102 after the verification of the admission and the retrieval of the metadata in step 404. On the basis of the key created in step 428, the reduced version of the original product, i.e. the preview, is created in server 102 in step 430 by encrypting at least parts of the original. Subsequently, the thus produced preview is transmitted, along with the transaction data, to the first buyer 100, as is shown at 432. In step 412, as has already been shown in FIG. 4, the personalized preview is created, but here is created using the data received from the server.

The subsequent steps up to the purchase performed by the second buyer 108 correspond to those in FIG. 4. Unlike in FIG. 4, however, in this embodiment, no full version is sent to the second buyer 108 by server 102 after purchase, but, as is shown at 434, it is rather the key for decrypting that is transmitted to the second buyer 108, so that the latter obtains, at 436, the full version, i.e. the original version, by decrypting the encrypted parts of the "large preview".

With regard to the creation of the preview in connection with the use of the "large previews", two technologies are preferably considered. The first technology is the so-called hierarchical coding. Here, the original version is encrypted such that a so-called base layer with an inferior version of a lower bit rate is produced, and an improvement layer is additionally provided, which is present in an encrypted manner. The latter may only be decrypted again with the corresponding key, which then results in the full version due to the combination of the two layers.

A further approach to creating the large preview is audio-scrambling, which includes applying the encryption directly to the bit stream, so that the absence of the appropriate key causes the audio quality to be impaired.

With regard to the above description of the preferred embodiments with reference to FIGS. 3-5 it is to be pointed out that this description is specifically related to audio data, but that the present invention is not limited thereto. The inventive basic principles apply generally to all data by means of which a virtual product is represented, and here, they relate to multimedia data, in particular. In addition to the above-described possibility of paying a commission to the first buyer 100, there are, however, other possibilities of granting rewards, including, for example, bonuses, titles, privileges, contacts with artists, discounts, participations and the like.

In addition to these rewards being granted to the buyer 100, provision may be made, in accordance with a further embodiment, for these rewards to additionally be granted to the second buyer 108 upon purchase of the full version.

In addition to the above-described methods of creating a preview on the server or on the part of the first buyer 100, provision may also be made, alternatively, for prefabricated previews to be provided on server 102, which will then simply be loaded down by the user 100.

Even though the description given with regard to FIGS. 4 and 5 related to embodiments wherein the personalization always is effected on the part of the first buyer 100, this may also be effected on the server side on the basis of information, relating to the first buyer 100, which is available to the server 102 due to the registration of the first buyer 100, in this case there being only limited additional modeling possibilities on the part of the first buyer 100.

Even though the above descriptions of the preferred embodiments related to methods wherein only one single preview is distributed to a further buyer, it shall be pointed out that the present invention evidently is not limited thereto. Rather, provision may be made of a modification to the effect that the buyer 100 combines a plurality of previews to form a packet, and for the buyer to personalize this packet. This packet would then be passed on to the further buyer 108 by the first buyer 100, and buyer 108 could select and buy one, several or all previews from the packet, the corresponding information then being passed on again, in each case, to server 102 via the first buyer 100 so as to give the first buyer his/her reward.

In addition to the applications described in FIGS. 4 and 5, wherein a description was given of a later-date participation in the inventive method following a traditional purchase (via a physical carrier) or following an online purchase (via a file), there are also the following further possibilities of using the inventive method.

In accordance with a first example, the inventive method might also be used with new acquisitions via a download portal, the method here being initialized directly by the server 102. The identification in accordance with steps 400 and 402 would then be dispensed with. The server would obtain the necessary information about the buyer 100 directly from those pieces of information provided within the framework of the purchase of the file by the buyer.

With P2P service providers, the files of the previews could be shard instead of using the files of the originals.

With scout and preview portals, the previews are offered for free downloading to perform a popularity test for the new content, this test being effected by measuring value and distribution. With the download, the necessary information would be polled by whoever started the download, so as to insert this information into the preview file.

Entry codes for specific previews are distributed via print media, in particular at concerts, cinemas etc., additional information relating to the purchaser being obtained within the framework of ordering these previews, which information will then be provided to the purchaser in a file, along with the preview.

Provision may be made for mass distribution via networks or physical carriers, especially for the "large previews". Here, personalization will not be aimed at the individual buyer, but rather at the companies performing the distribution within this framework, so that after a purchase of a full version due to a preview thus obtained, the corresponding reward is granted to the promoter/company. However, the basic principles would be the same, with the exception that here a group of persons or a legal entity would be given the reward instead of the individual buyer, as was the case in the embodiments described.

In accordance with the invention, an improved method is thus provided, by means of which a plurality of files may be passed on to third parties, it being made possible to reward a content provider/first buyer in the event that one of the further parties buys the full version on the basis of the preview. The advantage is, in particular, that it is no longer necessary to directly distribute the full version to the further third party, but only the reduced version. Due to the specified reward, the present invention thus also provides an incentive for the first buyer not to pass on the original but merely the reduced preview.

Depending on the circumstances, the inventive method may be implemented in hardware or in software. The implementation may be on a digital storage medium, in particular a disc or CD with electronically readable control signals which may cooperate with a programmable computer system in such a manner that the appropriate method is performed. Thus, the invention generally also consists in a computer-program product with a program code, stored on a machine-readable carrier, for performing the inventive method if the computer-program product runs on a computer. In other words, the invention may thus be implemented as a computer program with a program code for performing the method if the computer program runs on a computer.

The task assigned to the server described in the preferred embodiments, which server provides the necessary information and data for the creation of previews and for personalization as well as for calculating the reward, may also be taken on by a central service/server (which provides the corresponding preview service for all content providers).

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method of passing on a virtual product from a first buyer to a second buyer, the method comprising:
   acquiring, by the first buyer, a predetermined right to an original version of the virtual product from a provider,
   obtaining, by the first buyer, the original version of the virtual product in a digital form from the provider, the original version of the virtual product having a predetermined quality,
   selecting the original version of the virtual product obtained from the first buyer and to be passed on to the second buyer, and extracting content identification data identifying the virtual product from the original version of the virtual product;
   logging in at a server computer and transmitting the content identification data to the server computer;
   obtaining a personalized copy having a reduced quality, the quality of the personalized copy being reduced compared to the predetermined quality by
      receiving, from the server computer, the personalized copy of the virtual product having the reduced quality, or
      receiving transaction data from the server computer, the transaction data uniquely referencing the first buyer, creating, by the first buyer, a copy of the virtual product having the reduced quality, and personalizing the copy of the virtual product having the reduced quality on the basis of the transaction data to obtain the personalized copy having the reduced quality,
   wherein the personalized copy of the virtual product having the reduced quality contains all information required for becoming a full-value version of the virtual product, the full-value version of the virtual product having a higher quality compared to the reduced quality, and the full-value version of the virtual product being achievable by a key only;
   passing on only the personalized copy of the virtual product having the reduced quality to the second buyer; and
   obtaining a reward after the second buyer has acquired the full-value version of the virtual product on the basis of the personalized copy of the virtual product having the reduced quality, wherein a reward is not obtained by the first buyer, when the second buyer has not acquired the full-value version of the virtual product on the basis of the personalized copy of the virtual product having the reduced quality, and
   wherein the steps of acquiring the predetermined right to the original version of the virtual product, obtaining the virtual product, selecting, logging in, receiving, passing on and obtaining a reward are performed by a first buyer computer.

2. A method of obtaining a virtual product from a first buyer by a second buyer, the method comprising:
   obtaining only a personalized copy of the virtual product having a reduced quality from the first buyer, the personalized copy of the virtual product having the reduced quality containing all information required for becoming a full-version of the virtual product, the full-version of the virtual product being achievable by a key only,
   wherein the personalized copy includes a copy of the virtual product having the reduced quality and information uniquely referencing the first buyer after the first buyer has acquired a predetermined right to an original version of the virtual product from a provider and after the first buyer has obtained the original version of the virtual product in a digital form from the provider, wherein the original version of the virtual product has a predetermined quality,
   wherein the reduced quality is reduced with respect to a quality of a full-version of the virtual product, and wherein the reduced quality is reduced with respect to the predetermined quality of the original version;
   extracting the information which uniquely references the first buyer from the personalized copy of the virtual product so as to separate the information from the copy of the virtual product having the reduced quality;
   reproducing the copy of the virtual product having the reduced quality;
   transmitting content identification data identifying the virtual product and information uniquely referencing the first buyer to the server computer;
   obtaining the key from the server computer; and
   creating a full-version of the virtual product from the copy of the virtual product having the reduced quality using the key,
   wherein the steps of obtaining only a personalized copy, extracting, reproducing, transmitting, obtaining the key and creating are performed by a second buyer computer.

3. A method of passing on a virtual product from a first buyer to a second buyer, the method comprising:
   receiving login information and content identification data identifying a virtual product to be passed on from the first buyer to the second buyer after the first buyer has acquired a predetermined right to an original version of the virtual product from a provider and after the first buyer has obtained the virtual product in an original version in a digital form having a predetermined quality from the provider;
   verifying, on the basis of the login information, whether the first buyer is a registered user;
   authorizing the first buyer to create a copy of the virtual product having a reduced quality;
   creating and transmitting transaction data to the first buyer, the transaction data uniquely referencing the first buyer, or creating and transmitting a personalized copy of the virtual product having the reduced quality to the first buyer in response to the step of authorizing the first buyer to create a copy of the virtual product having the reduced quality,
   wherein the copy of the virtual product having the reduced quality contains all information required for becoming a full-version of the virtual product, wherein the full-version of the virtual product has a higher quality compared to the reduced quality, the full-version of the virtual product being achievable by a key only, and wherein the reduced quality is lower than the predetermined quality;
   obtaining content identification data identifying the virtual product and information uniquely referencing the first buyer from the second buyer; and
   granting a reward only when content identification data identifying the virtual product and information uniquely referencing the first buyer have been obtained, in the step of obtaining, from the second buyer indicating that the second buyer has acquired the full version of the virtual product on the basis of the personalized copy of the virtual product having the reduced quality; and
   transmitting the key to the second buyer,
   wherein the steps of verifying, creating, obtaining the content identification data, granting the reward and transmitting the key are performed by a server computer.

4. A method of passing on a virtual product from a first buyer to a second buyer, the method comprising:

acquiring, by the first buyer, a predetermined right to an original version of the virtual product from a provider;

obtaining, by the first buyer, the original version of the virtual product in a digital form from the provider of the virtual product, the original version of the virtual product having a predetermined quality, selecting the original version of the virtual product obtained from the first buyer and to be passed on to the second buyer, and extracting content identification data identifying the virtual product from the original version of the virtual product;

logging in at a server computer and transmitting the content identification data to the server computer;

obtaining a personalized copy having a reduced quality, the quality of the personalized copy being reduced compared to the predetermined quality by receiving, from the server computer, the personalized copy of the virtual product the having reduced quality, or receiving transaction data from the server computer, the transaction data uniquely referencing the first buyer, creating, by the first buyer, a copy of the virtual product having the reduced quality, and personalizing the copy of the virtual product having reduced quality on the basis of the transaction data to obtain the personalized copy having the reduced quality;

passing on only the personalized copy of the virtual product having the reduced quality to the second buyer; and obtaining a reward after the second buyer has acquired a full version of the virtual product on the basis of the personalized copy of the virtual product having the reduced quality, wherein a reward is not obtained by the first buyer, when the second buyer has not acquired the full-value version of the virtual product on the basis of the personalized copy of the virtual product having the reduced quality, wherein the full-version of the virtual product has a higher quality compared to the reduced quality, wherein the steps of acquiring a predetermined right, obtaining the virtual product, selecting, logging in, receiving, passing on and obtaining a reward are performed by a first buyer computer.

5. A method of obtaining a virtual product from a first buyer by a second buyer, the method comprising:

obtaining only a personalized copy of the virtual product having a reduced quality from the first buyer, the personalized copy of the virtual product including a copy of the virtual product having the reduced quality and information uniquely referencing the first buyer, after acquiring, by the first buyer, a predetermined right to an original version of the virtual product from a provider and after obtaining, by the first buyer, the original version of the virtual product in a digital form from the provider, wherein the original version has a predetermined quality;

extracting the information which uniquely references the first buyer from the personalized copy of the virtual product having the reduced quality so as to separate the information from the copy of the virtual product having the reduced quality;

reproducing the copy of the virtual product having the reduced quality;

transmitting content identification data identifying the virtual product and information uniquely referencing the first buyer to the server computer; and obtaining a full version of the virtual product from the server computer, wherein the full-version of the virtual product has a higher quality compared to the reduced quality, and wherein the reduced quality is lower than the predetermined quality, wherein the steps of obtaining, extracting, reproducing, transmitting, obtaining the full version and creating are performed by a second buyer computer.

6. A method of passing on a virtual product from a first buyer to a second buyer, the method comprising:

receiving login information and content identification data identifying a virtual product to be passed on from the first buyer to a second buyer after the first buyer has acquired a predetermined right to an original version of the virtual product from a provider, and after the first buyer has obtained the original version of the virtual product in a digital form from the provider, wherein the original version has a predetermined quality;

verifying, on the basis of the login information and the content identification data, whether the first buyer is a registered user;

authorizing the first buyer to create a copy of the virtual product having a reduced quality;

creating and transmitting transaction data to the first buyer, the transaction data uniquely referencing the first buyer or creating and transmitting a personalized copy of the virtual product having the reduced quality to the first buyer, in response to the step of authorizing the first buyer to create a copy of the virtual product having the reduced quality, wherein the reduced quality is reduced compared to the predetermined quality;

obtaining content identification data identifying the virtual product and information uniquely referencing the first buyer from the second buyer; and granting a reward only when content identification data identifying the virtual product and information uniquely referencing the first buyer have been obtained, in the step of obtaining, from the second buyer indicating the second buyer has acquired a full version of the virtual product on the basis of the personalized copy of the virtual product having the reduced quality; and transmitting a full version of the virtual product to the second buyer, wherein the full-version of the virtual product has a higher quality compared to the reduced quality, wherein the steps of verifying, creating, obtaining, granting and transmitting are performed by a server computer.

* * * * *